United States Patent [19]
Delepine et al.

[11] Patent Number: 5,879,098
[45] Date of Patent: Mar. 9, 1999

[54] DEVICE FOR THE TIGHT CROSSING OF A PARTITION BY A MOBILE MEMBER

[75] Inventors: Jean Delepine, Gieres; Thierry Duffar, Grenoble; Jean-Philippe Nabot, Saint-Egreve; Bernard Wales, Poisat, all of France

[73] Assignee: Commissariat a l'Energie Atomique, Paris, France

[21] Appl. No.: 823,970

[22] Filed: Mar. 25, 1997

[30] Foreign Application Priority Data

Apr. 3, 1996 [FR] France ............................ 96 04169

[51] Int. Cl.$^6$ ............................. F16B 1/00; F16J 15/50
[52] U.S. Cl. ..................... 403/223; 403/221; 74/18.2; 277/634
[58] Field of Search ................ 74/18.1, 18, 18.2; 464/170, 171, 173; 277/636, 634, 635, 627; 403/220, 219, 291; 285/123.5, 123.6, 123.7, 124.1

[56] References Cited

U.S. PATENT DOCUMENTS

| | | | |
|---|---|---|---|
| 1,861,726 | 6/1932 | Trout | 285/123.6 X |
| 2,019,052 | 10/1935 | Lord | 403/221 X |
| 2,555,347 | 6/1951 | Lee | 403/223 X |
| 3,042,394 | 7/1962 | Bliss | 403/220 X |
| 4,295,653 | 10/1981 | Coles | 277/634 X |
| 4,311,057 | 1/1982 | Lombardi . | |
| 5,048,847 | 9/1991 | Kovacs et al. . | |

FOREIGN PATENT DOCUMENTS

| | | |
|---|---|---|
| 653504 | 5/1995 | European Pat. Off. . |
| 1560122 | 3/1969 | France . |
| 2707180 | 1/1995 | France . |
| 2146713 | 4/1985 | Germany . |

*Primary Examiner*—Rodney H. Bonck
*Assistant Examiner*—Marcus Charles
*Attorney, Agent, or Firm*—Pearne, Gordon, McCoy & Granger LLP

[57] ABSTRACT

This device is for the tight crossing of a partition or bulkhead by a mobile member. The object of the invention is to supply a device permitting the transfer of simultaneous, complex mechanical movements through a tight partition, whilst maintaining the seal of the partition. This object is achieved with the aid of a device having at least one shell or sleeve (4) mounted on a partition so as to pivot about a pivoting axis perpendicular to the crossing axis of the partition by the member and the displacement direction of the member. The member passes in the interior of the sleeve. A plate (12) is tightly traversed by the member (10) and mobile with the member for its displacements in the displacement direction. First and second tight membranes (14 and 16) tightly connect the plate (12)/sleeve (4) and sleeve (4)/partition (8).

10 Claims, 6 Drawing Sheets

DEVICE FOR THE TIGHT CROSSING OF A PARTITION BY A MOBILE MEMBER

BACKGROUND OF THE INVENTION

The present invention relates to a device for the tight crossing of a partition or bulkhead by a member, such as a member for transmitting into an enclosure movements created outside the latter, whilst maintaining the seal of said enclosure.

Certain operations have to be carried out in tight enclosures, where it must be possible to control or monitor the operating conditions such as the atmosphere, temperature and pressure. These operations may necessitate handling processes, requiring the presence of appropriate means controlled by motors. However it is not always possible to place such motors within enclosures, particularly due to the space which they take up, the pollution which they produce and/or the incompatibility of the operating conditions with the operation of said motors.

For example, the production process for monocrystalline or polycrystalline parts described in EP-A-653 504 must be performed in a tight enclosure, because it involves high temperatures requiring a controlled atmosphere to avoid the oxidation and pollution of the parts produced. Moreover, this process requires the handling of monocrystalline or polycrystalline parts during the manufacture thereof, so as to subject them to at least one translation movement perpendicular to the pulling direction of said parts, so as to give them more or less complex shapes.

Therefore the problem is to transfer to the interior of a tight enclosure movements produced by motors located outside the enclosure, whilst respecting the confinement and seal of the enclosure.

PRIOR ART

FR-A-2 707 180 describes a stirrer cover for a paint stirring machine. This cover is provided with a conventional sealing bellows on the stirring spindle, which allows rotary movements of the latter.

In the document "Les Techniques d l'Ingénieur" (Génie Mécanique B5 II 5421-1/6.11), the seal for dynamic connections is brought about with the aid of a flexible, metal member, which can be easily deformed and which is welded or brazed to each of the mobile and fixed surfaces. This document describes the use of metal bellows having welded disks and wavy metal bellows.

In the document "Les Techniques d l'Ingénieur" (Génie Mécanique B5 II 5421-9/7.12), the seal is brought about by a device using a magnetic transmission in which a magnetic part, integral with a driving shaft of a motor outside a tight enclosure, drives another magnetic part integral with a driven shaft within the tight enclosure, the tight enclosure partition being a magnetic and thin.

However, as a result of the very design of these devices, it is only possible for them to transfer simple mechanical movements through a tight partition, such as the rotation of a shaft, the translation of a member in the crossing direction of the tight partition by said member, said movements being very limited in directions perpendicular to the tight partition crossing direction. Thus, these devices do not permit the transfer of simultaneous, complex mechanical movements through a tight partition.

BRIEF SUMMARY OF THE INVENTION

The object of the present invention is to supply a novel device for the tight crossing of a partition, making it possible to solve the problems referred to hereinbefore.

This novel device for the tight crossing of a partition by a mobile member in at least one displacement direction perpendicular to a crossing axis of the partition by said member is characterized in that it comprises:

at least one sleeve fitted to the partition so as to pivot about a pivoting axis perpendicular to the crossing axis of the partition by the member and the displacement direction of said member, the member passing in the interior of the sleeve, a plate tightly traversed by the member and mobile with said member for its displacements in said displacement direction, a first and a second tight membranes, the first membrane tightly connecting a first end of the sleeve to the partition, the second membrane tightly connecting a second end of the sleeve to the plate.

When the member is mobile in several displacement directions perpendicular to the crossing axis of the partition by said member, the device comprises:

a first and a second sleeves placed end to end and traversed by the member, the first sleeve being fitted to a partition so as to pivot about a first axis and tightly connected to the partition by the first tight membrane and the second sleeve is fitted so as to pivot about a second axis and is tightly connected to the plate by the second tight membrane, the first and second axes being perpendicular to one another and to the crossing axis of the partition by the member, a tight connecting means interposed between the adjacent ends of the first sleeve and the second sleeve.

According to a variant, the tight connection means comprises a third sleeve having a first end tightly connected to the second end of the first sleeve by a third tight membrane and a second end tightly connected to a first end of the second sleeve by a fourth tight membrane.

According to another variant, with the first sleeve and the second sleeve having different diameters, the tight connection means comprises a fifth tight membrane connecting the adjacent ends of the first sleeve and the second sleeve.

Preferably, the tight membranes are elastomeric membranes.

According to a special embodiment, the device comprises means for controlling the displacement of the plate in said displacement direction.

The member can also perform a rotary movement about its partition crossing axis and/or a translation movement in accordance with said crossing axis. A seal or gasket is then interposed between the member and the plate.

In a first application of the invention to the pulling of crystals, the member is a pulling spindle.

In a second application of the invention to the pulling of crystals, the member is connected to a crucible.

BRIEF DESCRIPTION OF THE DRAWINGS

The characteristics and advantages of the invention can be gathered from studying the following description of exemplified, non-limitative embodiments with reference to the attached drawings, wherein show.

DETAILED DESCRIPTION OF EMBODIMENTS OF THE INVENTION

Figure 1A:
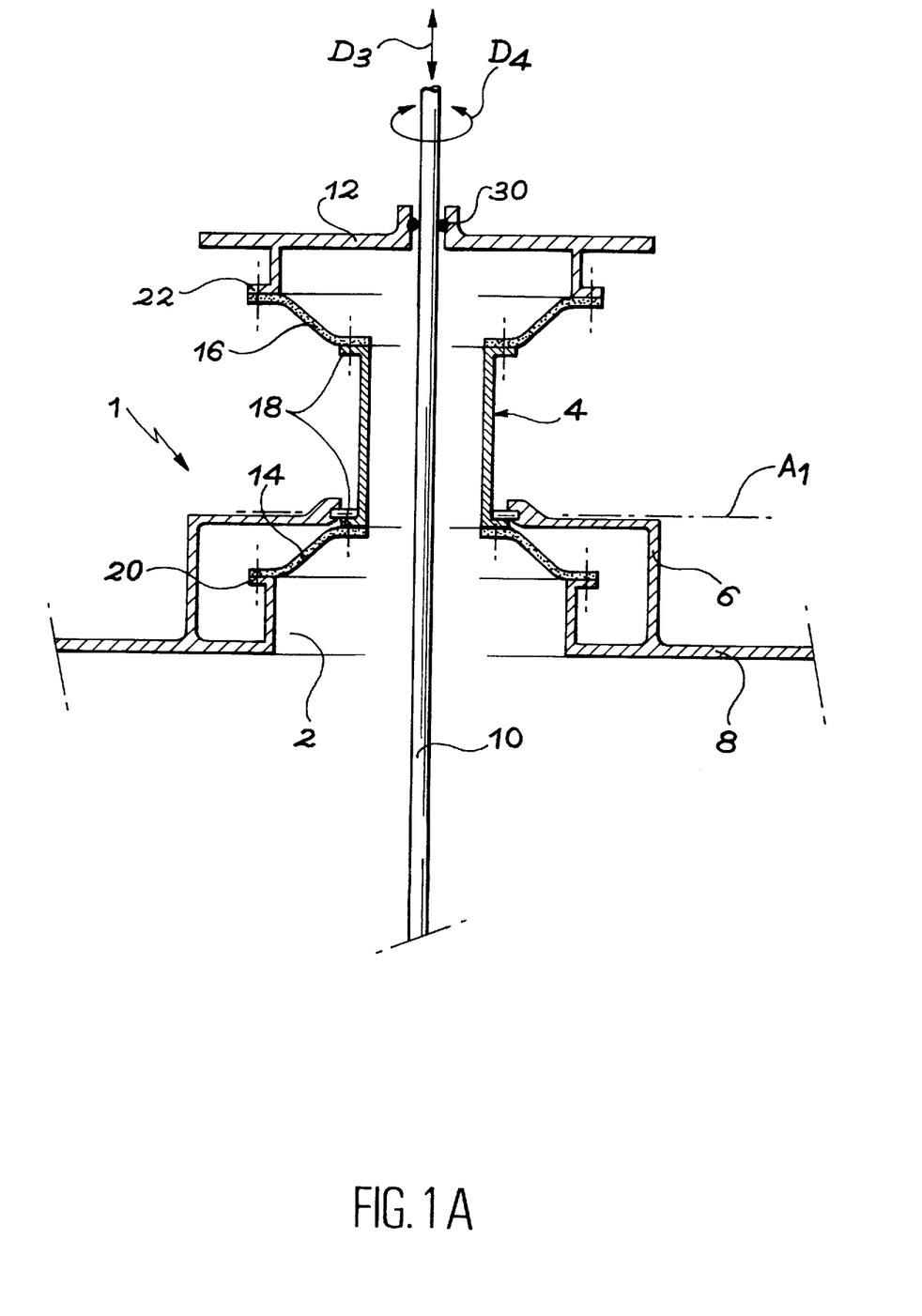
FIGS. 1A and 1B Cross-sectional views of a device for the tight crossing of a partition by a member illustrating a first embodiment of the invention, respectively in an undeformed state and in a deformed state, the section 1B being perpendicular to the section 1A.
Figure 1B:
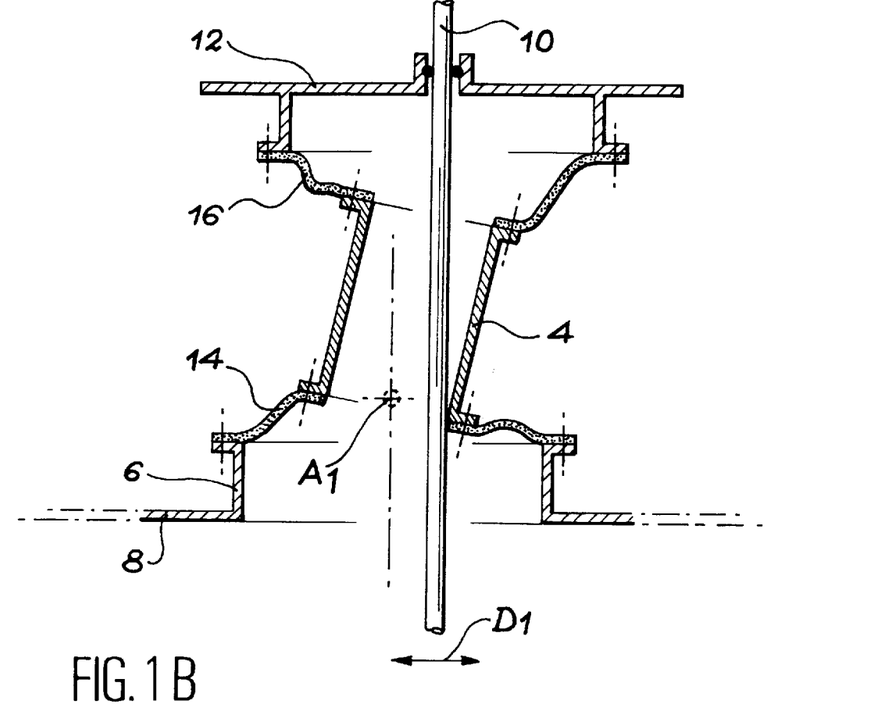

A first embodiment of the invention is illustrated in FIGS. 1A and 1B.

A tight partition or bulkhead 8 defines a tight enclosure, said tight partition being completely traversed at an opening 2 by a member 10.

The member 10 can be mobile in a displacement direction D1 (FIG. 1B) perpendicular to its partition crossing axis, in the partition crossing direction D3 and in the rotation direction D4 about its crossing axis.

The passage of the mobile member 10 through the partition 8 is sealed by means of the device 1 according to the invention. On said device 1, reference 4 designates a cylindrical shell or sleeve fitted around the member 10. A first end of the sleeve 4 is fitted so as to pivot about an axis A1 on a support 6 integral with the partition 8, the axis A1 being perpendicular to the crossing axis of the partition by the mobile member and to the direction D1.

The second end of the sleeve 4 is connected to a mobile plate 12, which is tightly traversed by the member 10, so that the latter can rotate about its axis in direction D4 and can move freely in accordance with its axis in direction D3. The plate 12 drives the member 10 when the latter must be laterally displaced, i.e. in the displacement direction D1 perpendicular to the crossing axis of the partition by the mobile member.

The seal between the plate 12 and the mobile member 10 is provided by an O-ring 30.

At both its first and second ends, the sleeve 4 has an external flange 18. The partition 8 also has an external flange 20, around the passage 2 and oriented towards the sleeve 4.

The first end of the sleeve 4 is tightly connected to the partition by a first tight membrane 14 connecting the flange 20 of the partition 8 to the flange 18 of the first end of the sleeve 4. The second end of the sleeve 4 is connected to the plate 12 by a second tight membrane 16 connecting the flange 22 of plate 12 to the flange 18 of the second end of the sleeve.

Figure 2:
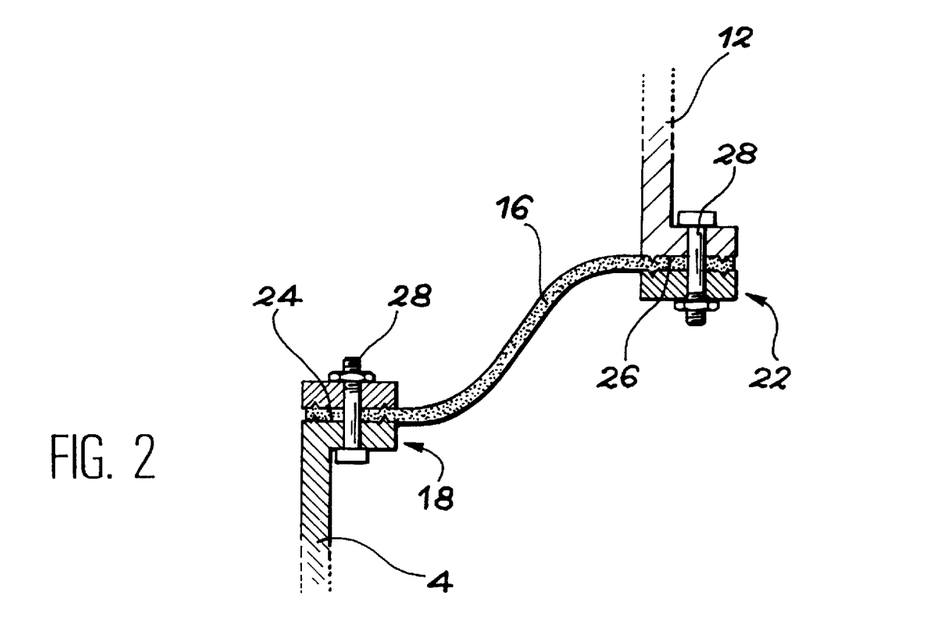
FIG. 2 A larger-scale sectional view illustrating an example of a method of fixing one of the tight membranes of the device of FIGS. 1A and 1B.

FIG. 2 illustrates in greater detail the tight connection provided by the tight membrane 16 between the flange 18 of the second end of the sleeve 4 and the flange 22 of the plate 12. In this example, the bearing surfaces 24 and 26 respectively of the flanges 18 and 22 are machined so as to ensure a good holding behaviour of the tight membrane 16 attached all round the flanges by bolts 28. The tight connection provided by the right membrane 14 between the flanges 20 and 18 is brought about in a similar way.

In this first embodiment of the device according to the invention, the flanges are not in the same plane and the tight membrane is cambered. It can also have other shapes. For example, the tight membrane can be flat and then the flanges are at the same level, but this configuration reduces the overall flexibility.

For systems having to operate under a vacuum, the thickness and surface of the tight membranes are calculated on the basis of conventional material resistance and strength methods. Thus, when the enclosure is under a vacuum, it is necessary for the membrane to resist the atmospheric pressure applied.

The tight membranes used in this example are vacuum-tight elastomeric membranes. Elastomeric membranes have the advantage of a high stability to machine work and chemical products. The use of other tight membrane types is not excluded.

In this embodiment of the invention, the plate 12 supports the member 10 and the not shown motors control the displacements of said member (rotation D4, translation in accordance with axis D3 and translation in direction D1).

For example, the displacement in direction D1 can take place under the effect of a motor, an endless screw and not shown guide rails.

FIG. 1B illustrates a cross-section at right angles with respect to FIG. 1A of device 1, but in which the plate 12 has been displaced in the displacement direction D1. In FIG. 1B, the plate 12, displaced from left to right, has driven the mobile member 10 and simultaneously by means of the elastomeric membranes has rotated the sleeve 4 about the axis A1.

The plate 12 is shown at the end of its travel. Thus, the mobile member is in abutment against the first end of the sleeve 4. The membranes 14 and 16 are deformed in relation to the displacement of the plate 12 and with the rotation of the sleeve about the axis A1 and maintain the seal of the system.

For example, the displacement of the device between the positions of FIGS. 1A and 1B corresponds to an 8 cm displacement of the mobile member in a direction perpendicular to the crossing axis of the partition by the member, for a sleeve having an internal diameter of 20 cm and a length of 33 cm.

This first embodiment of the invention permits a mobility of the member 10, traversing the tight partition, in the displacement direction D1 (perpendicular to the crossing axis of the partition by the member), the translation in accordance with axis D3 and the rotation D4, whilst still respecting the necessary sealing of the enclosure.

Figure 3:
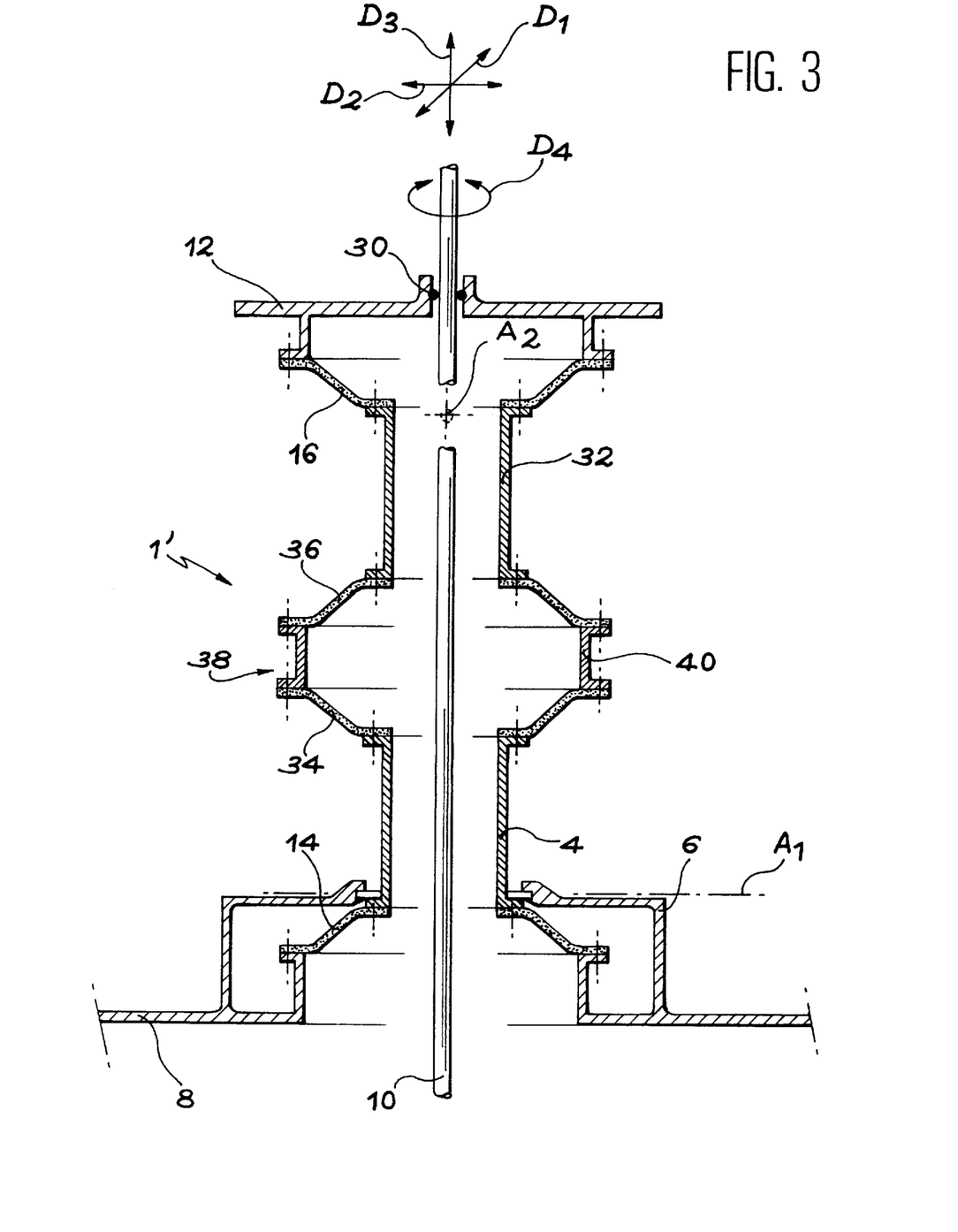
FIG. 3 A cross-sectional view of a device illustrating a second embodiment of the invention.

FIG. 3 illustrates a second embodiment of the device according to the invention.

This more complex device 1' permits the displacement of the plate 12 simultaneously in a first displacement direction D1 and in a second displacement direction D2, D1 being perpendicular to D2 and D1 and D2 are perpendicular to the crossing axis of the partition by the member 10.

The perpendicular displacements of the plate 12 in accordance with D1 and D2 are e.g. ensured by a conventional, not shown displacement table X-Y having two motors.

In FIG. 3 it is possible to see, traversed by the member 10, the sleeve 4 pivoting about the axis A1, and the support 6, integral with the enclosure 8 and on which bears said axis A1. It is also possible to see the elastomeric membrane 14 tightly connecting the enclosure flange 20 to the sleeve 4 and the elastomeric membrane 16 tightly connected to the plate 12.

To the elements referred to hereinbefore are added a second sleeve 32, whereof a first end is fitted so as to pivot about an axis A2 on a not shown support integral with the plate 12. The rotation axis A2 of the second sleeve 32 is perpendicular to the rotation axis A1 of the first sleeve 4 and to the crossing axis of the partition by the member 10.

The sleeves 4 and 32 are placed end to end and are completely traversed by the member 10. The first end of the sleeve 32 is tightly connected to the plate 12 by means of the elastomeric membrane 16. In this example, the sleeves 34 and 32 have the same diameter.

A tight connection means 38 is interposed between the adjacent ends of the first sleeve 4 and the second sleeve 32. In the variant shown, said tight connection means comprises a third sleeve 40 equipped with flanges at its ends. The diameter of said third sleeve 40 exceeds that of the sleeves 4 and 32.

A first end of the sleeve 40 is tightly connected to the second end of the sleeve 4 by fixing an elastomeric membrane 34 to the flanges of the sleeves 4 and 40 by the same means as described with reference to FIG. 2. The second end of the sleeve 40 is connected in the same way to the second end of the sleeve 32 by fixing an elastomeric membrane 36.

In this second embodiment of the device according to the invention, the displacements of the plate 10 in direction D1 are followed by the sleeve 4 and its displacements in direction D2 are followed by sleeve 32.

The four membranes 14, 16, 34 and 36 share the deformations due to the displacements D1 and D2, i.e. the rotation of the sleeves 2 and 30 about the respective axes A1 and A2.

This second embodiment of the device for the tight crossing of a partition by a mobile member permits the transmission into a tight enclosure of movements created outside said enclosure in all directions and whilst respecting the enclosure seal.

Figure 4:
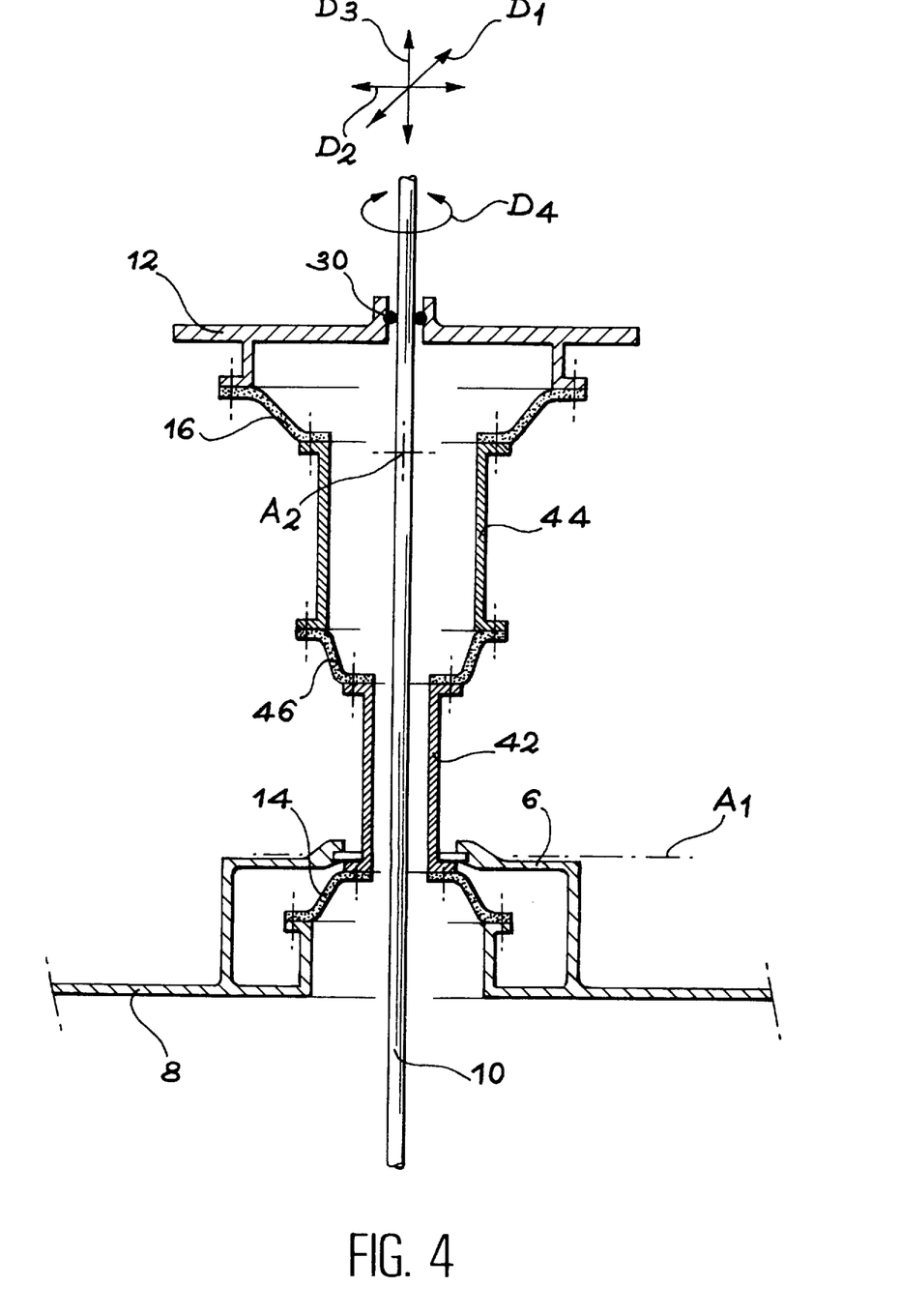
FIG. 4 A longitudinal sectional view of a device illustrating a variant of the second embodiment of the invention.

FIG. 4 illustrates a variant of the second embodiment of the device according to the invention. In FIG. 4, the references 42 and 44 designate two cylindrical sleeves of different diameters, placed end to end and completely traversed by the mobile member 10. Once again it is possible to see all the elements of FIG. 3, except that the tight connection means 38 is in this case constituted by a single elastomeric membrane 46 directly tightly connecting the adjacent ends of the two sleeves 44 and 46 in accordance with the means of FIG. 2.

Figure 5:
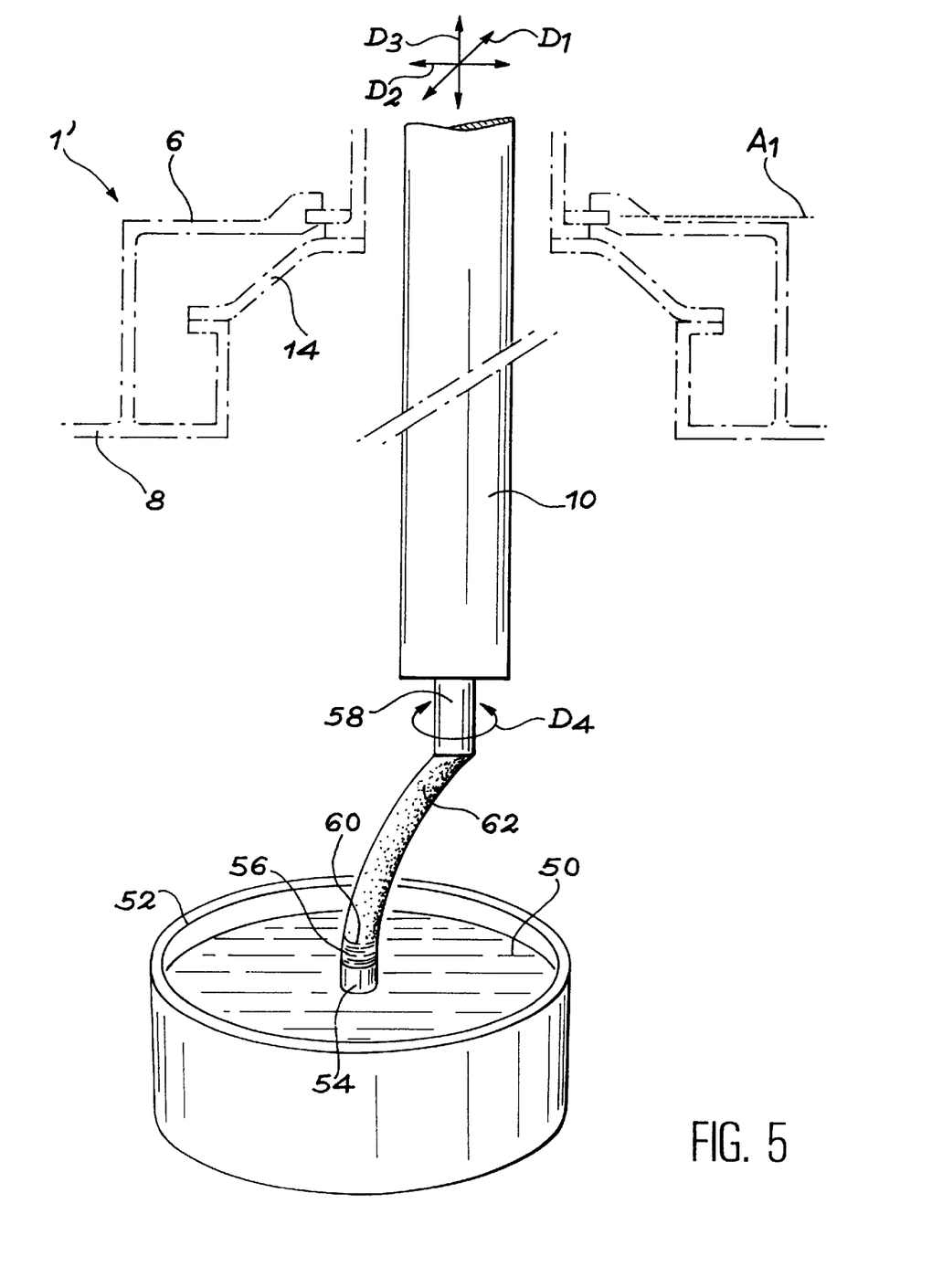
FIG. 5 A diagrammatic perspective view illustrating an application of the second embodiment of the device according to the invention to the pulling of crystals in which the member is a crystal pulling spindle.

FIG. 5 is a diagrammatic perspective view illustrating an application of the second embodiment of the device according to the invention to the pulling of crystals. Thus, in FIG. 5, it is possible to see all the elements of the device 1' described in FIG. 3 and the mobile member 10 is a crystal pulling spindle.

The application of the device according to the invention can be clearly gathered from EP-A-653 504. This document describes a process for the production of a monocrystalline or polycrystalline part consisting of forming the part from a molten material bath by pulling through a nozzle and crystallization of the molten material passing out of the nozzle on a nucleus. The process described in this document provides for the subjecting of the nozzle and/or crystallization nucleus to at least one translation movement in a plane perpendicular to the pulling direction during the production of the monocrystalline or polycrystalline part.

In FIG. 5, the molten material 50 is placed in a crucible 52 and rises via a nozzle 54 so as to form a meniscus 56 and solidifies on a nucleus 58, which is driven by the pulling spindle 10 in a pulling direction D3, the solid-liquid interface 60 being positioned above the nozzle. The monocrystalline or polycrystalline part formed carries the reference 62.

Thus the device 1' according to the invention permits a displacement of the pulling spindle 10 in directions D1, D2 and D3 during pulling, so as to obtain crystalline parts with complex shapes, whilst still respecting the sealing of the enclosure indispensable for the purity and homogeneity of the crystals formed.

By subjecting the pulling spindle to a rotary movement D4 about an axis centred on the nucleus of said spindle, axially symmetrical shapes are obtained.

As a result of the device according to the invention, the displacement motors for the member 10 are located outside the tight enclosure.

Another advantage resulting from the use of the device according to the invention is a freeing of the enclosure.

The crystal pulling process is associated with a certain number of means for measuring and regulating the operating conditions, such as pumping and control of gases, heating, heat shield, acquisition and checking of data and visual monitoring of handling operations and the results. The freeing of the enclosure is a particular advantage for such handling operations under confined conditions.

Figure 6:
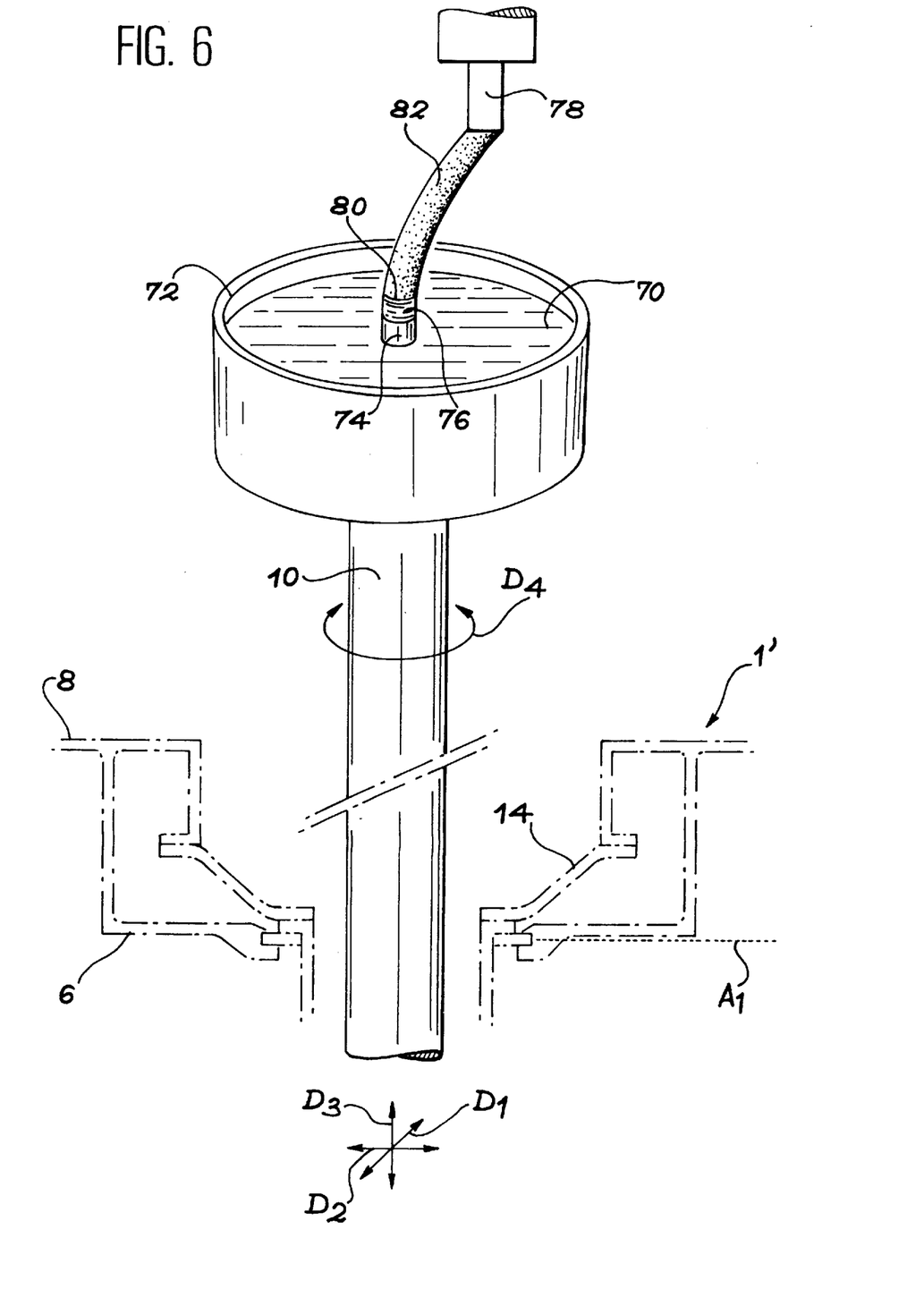
FIG. 6 A diagrammatic perspective illustrating an application of the second embodiment of the device according to the invention to the pulling of crystals, in which the member is connected to a crucible.

FIG. 6 illustrates another application of device 1' according to the invention to the pulling of crystals. In this application use is made of the device described relative to FIG. 3. However, the device 1' is placed below the tight enclosure defined by the partition 8 and the mobile member 10 carries a crucible 72. The molten material 70 is placed in the mobile crucible 72 and rises via a nozzle 74 so as to form a meniscus 76 and solidifies on a fixed nucleus 78. Thus, device 1' illustrated in this drawing permits a displacement of the crucible 72 in directions D1, D2, D3 and D4 during pulling and makes it possible to obtain crystalline parts with complex shapes.

A different distribution of the movements applied to the crucible and the pulling spindle during the pulling of crystals is not excluded. Thus, for example, it is possible to apply to the pulling spindle a translation movement in the tight partition crossing direction and also a rotary movement, whilst movements D1 and D2 perpendicular to the tight partition crossing direction by the member associated with the crucible can be applied to the latter. In this example, device 1' according to the invention is positioned in the manner shown in FIG. 6.

This device is of interest for any process requiring the transmission of movements through a tight enclosure. All the vertical walls and bottom of the enclosure remain available for fulfilling other functions, namely emptying, passage of heating power, observations, supports and displacements.

We claim:

1. Device for the tight crossing of a partition (8) said partition (8) being the partition of a sealed enclosure, characterized in that said device comprises:

a member used for transmitting into said tight enclosure movements created outside the enclosure, said device enabling said member (10) to be mobile in at least one displacement direction perpendicular to a crossing axis of the partition by said member while maintaining the seal of said enclosure, a plate (12) tightly traversed by the member (10) and mobile with said member for its displacement in said displacement direction, at least one sleeve (4) having the member passing in the interior of the sleeve, fitted to the partition (8) so as to pivot relative to the partition and the plate about a pivoting axis perpendicular to the crossing axis and the displacement direction of said member, first and second tight membranes (14, 16), the first membrane (14) tightly connecting a first end of the sleeve (4) to the partition (8), the second membrane (16) tightly connecting a second end of the sleeve (4) to the plate (12).

2. Device according to claim 1, in which the member is mobile in several displacement directions perpendicular to the crossing axis of the partition by said member, characterized in that the device comprises:

a first and a second sleeves (4 , 32) placed end to end and traversed by the member, the first sleeve (4) being fitted to a partition (8) so as to pivot about a first axis and tightly connected to the partition (8) by the first tight membrane (14) and the second sleeve (32) is fitted so as to pivot about a second axis and is tightly connected to the plate (12) by the second tight membrane (16), the first and second axes being perpendicular to one another and to the crossing axis of the partition by the member, a tight connecting means (38) interposed between the adjacent ends of the first sleeve (4) and the second sleeve (32).

3. Device according to claim 2, characterized in that the tight connection means (38) comprises a third sleeve (40) having a first end tightly connected to the second end of the first sleeve (4) by a third tight membrane (34) and a second end tightly connected to a first end of the second sleeve (32) by a fourth tight membrane (36).

4. Device according to claim 2, characterized in that the first sleeve (42) and second sleeve (44) have different diameters, so that the tight connection means comprises a fifth tight membrane (46) connecting the adjacent ends of the first sleeve (42) and the second sleeve (44).

5. Device according to either claim 3 or claim 4, characterized in that the tight membranes are elastomeric membranes.

6. Device according to claim 5, characterized in that the member performs a rotary movement about its partition crossing axis.

7. Device according to claim 6, characterized in that the member performs a translation movement D3 in the direction of the crossing axis of the partition by said member.

8. Device according to claim 7, characterized in that the device comprises means for controlling the displacement of the plate (12) in at least one displacement direction.

9. Device according to claim 8, characterized in that with said device applied to the pulling of crystals, the member (10) is a pulling spindle.

10. Device according to claim 9, characterized in that the said device being applied to the pulling of crystals, the member (10) is connected to a crucible.

* * * * *

UNITED STATES PATENT AND TRADEMARK OFFICE
CERTIFICATE OF CORRECTION

PATENT NO. : 5,879,098
DATED : March 9, 1999
INVENTOR(S) : Delepine et al.

It is certified that error appears in the above-indentified patent and that said Letters Patent is hereby corrected as shown below:

Column 1, Line 53, delete "a magnetic" and insert --amagnetic--.

Signed and Sealed this

Thirteenth Day of July, 1999

Attest:

Q. TODD DICKINSON

*Attesting Officer*     Acting Commissioner of Patents and Trademarks